(12) United States Patent
Nagata et al.

(10) Patent No.: US 6,539,722 B2
(45) Date of Patent: Apr. 1, 2003

(54) GAS TURBINE PLANT AND METHOD OF CONTROLLING GAS TURBINE PLANT

(75) Inventors: Shouichi Nagata, Takasago (JP); Hiroya Komiyama, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/908,638

(22) Filed: Jul. 20, 2001

(65) Prior Publication Data

US 2002/0011063 A1 Jan. 31, 2002

(30) Foreign Application Priority Data

Jul. 21, 2000 (JP) ........................................ 2000-220814

(51) Int. Cl.[7] ................................................. F02C 9/26
(52) U.S. Cl. ...................................... 60/773; 60/39.281
(58) Field of Search ............................... 60/39.281, 773

(56) References Cited

U.S. PATENT DOCUMENTS 5,252,860 A * 10/1993 McCarty et al. ............... 60/773
5,609,016 A * 3/1997 Yamada et al. .......... 60/39.281
6,230,479 B1 * 5/2001 Kawamura et al. ........... 60/773

FOREIGN PATENT DOCUMENTS

| JP | 7-332021 | 12/1995 |
| JP | 8-270407 | 10/1996 |

\* cited by examiner

*Primary Examiner*—Michael Koczo
(74) *Attorney, Agent, or Firm*—Wenderoth, Lind & Ponack, L.L.P.

(57) ABSTRACT

A gas turbine plant for limiting a sudden increase of load of the gas turbine, i.e., of the amount of fuel, and suppressing a stress of the turbine, or for maintaining a suitable fuel-air ratio is disclosed. The plant includes a controller comprising a section for calculating a governor signal for controlling the degree of opening of the fuel valve, based on a revolution speed of the gas turbine; and a section for calculating a load-limiting signal for following the governor signal, wherein when the governor signal decreases, the load-limiting signal is larger than it by a predetermined value, while when the governor signal increases, the increase rate of the load-limiting signal has a predetermined upper limit. The controller also comprises a limiting section, into which both signals are input, for limiting the upper value of the governor signal by using the load-limiting signal as an upper limit.

2 Claims, 11 Drawing Sheets

GAS TURBINE PLANT AND METHOD OF CONTROLLING GAS TURBINE PLANT

BACKGROUND OF THE INVENTION

1. Field of the Invention

The present invention relates to a gas turbine plant used in a power generation plant and to a method of controlling such a gas turbine plant.

2. Description of the Related Art

FIG. 9 shows the general structure of a conventional single-shaft combined plant (i.e., gas turbine plant).

In the shown single-shaft combined plant, reference numeral 101 indicates a compressor for absorbing and compressing the air, reference numeral 102 indicates a combustor to which combustion oil and combustion air (which has been compressed in the compressor 101) are supplied, reference numeral 103 indicates a gas turbine which rotates when receiving a combustion gas generated by the combustor 102, reference numeral 104 indicates a steam turbine coupled with the gas turbine 103, and reference numeral 105 indicates a generator.

The above gas turbine 103, compressor 101, steam turbine 104, and generator 105 are coupled with each other via a coupling shaft 106.

The drive source for the steam turbine 104 is an exhaust heat recovery boiler 108. The exhaust heat recovery boiler 108 generates steam by using heat collected from the high-temperature exhaust gas output from the gas turbine 103, and introduces the generated steam into the steam turbine 104. Reference numeral 107 indicates a condenser into which exhaust steam from the steam turbine 104 is introduced. The condenser 107 condenses the introduced steam and returns condensate (i.e., condensed water) to the exhaust heat recovery boiler 108.

Reference numeral 109 indicates a fuel valve for controlling the amount of fuel supplied to the combustor 102. This fuel valve 109 is controlled by a controller 110.

The combustor 102 has a structure shown in FIG. 10. In FIG. 10, reference numeral 112 indicates a main combustor, and reference numeral 113 indicates a tail pipe of the main combustor. Fuel is supplied to the main combustor 112 via the fuel valve 109, and air 114 is also supplied to the main combustor 112 from the compressor 101, thereby combusting the fuel.

Reference numeral 115 indicates a bypass valve which is controlled by the controller 110. Depending on the degree of opening of the bypass valve 115, the distribution of air from the compressor 101, that is, the ratio of air supplied to the main combustor 112 to air supplied to the tail pipe 113, is determined.

In the combined plant explained above, when the frequency of the electric power system is changed due to a load change, the frequency must be stabilized by controlling the generated power. The above controller 110 controls the fuel valve 109 so as to recover a suitable frequency, thereby controlling the output of the gas turbine 103.

A concrete example of such a control will be explained below.

In FIG. 11, reference symbol S1 indicates a governor CSO (control signal output) signal output by the controller 110 to the fuel valve 109 so as to control the output of the gas turbine 103.

As shown by reference symbol "a", in the normal state, the controller 110 suitably varies the governor CSO signal S1 (corresponding to the output of the gas turbine 103) so as to fix the frequency.

When the amount of load suddenly decreases, the relevant revolution speed suddenly increases, and thus the frequency also increases. In this case, as shown by reference symbol b1, the controller 110 decreases the level of the governor CSO signal S1 so as to avoid a sudden increase of the revolution speed.

On the other hand, when the amount of load suddenly increases, the relevant revolution speed suddenly decreases, and thus the frequency also decreases. In this case, as shown by reference symbol c1, the controller 110 increases the level of the governor CSO signal S1 so as to avoid a sudden decrease of the revolution speed.

However, if the governor CSO signal S1 is suddenly increased, the temperature of the gas turbine 103 suddenly increases. It is not preferable because the gas turbine 103 should have a stress. Therefore, the controller 110 calculates, in advance, a load-limiting CSO signal S2 shown by reference symbol S2. In the normal state, the load-limiting CSO signal S2 has a level higher than that of the governor CSO signal S1 by a predetermined tracking width TW. When the governor CSO signal S1 suddenly increases or decreases, the load-limiting CSO signal S2 is increased or decreased by a specific rate. The controller 110 uses the load-limiting CSO signal S2 as an upper-limit value of the governor CSO signal S1.

Therefore, when the governor CSO signal S1 suddenly decreases, the level of the load-limiting CSO signal S2 is never less than the level of the governor CSO signal S1 (refer to reference symbol b1'); however, when the governor CSO signal S1 suddenly increases, the level of the load-limiting CSO signal S2 may be higher than the level of the governor CSO signal S1 (refer to reference symbol c1'). Therefore, the governor CSO signal S1 is limited so as not to increase with a rate higher than the above-explained specific rate (refer to reference symbol d1).

If the load suddenly increases immediately after a sudden decrease of the load, then the governor CSO signal S1 is controlled in a manner such that the signal suddenly decreases, and then suddenly increases (see FIG. 12).

That is, when the load suddenly decreases, as shown by reference symbol b2, the governor CSO signal S1 decreases without limitation, and the load-limiting CSO signal S2 decreases by a specific rate (see reference symbol b2').

After that, when the load suddenly increases, the governor CSO signal S1 suddenly increases (see reference symbol c2). In this case, the load-limiting CSO signal S2 continuously decreases until the load-limiting CSO signal S2 obtains a level 5% higher than that of the governor CSO signal S1 (see reference symbol b2'). The load-limiting CSO signal S2 then enters an increase phase, where the increase is performed at a specific rate because of a sudden increase of the governor CSO signal S1 (see reference symbol c2'). Accordingly, the governor CSO signal S1 is limited so as not to increase with a rate higher than the specific rate (see reference symbol d2), that is, the load-limiting CSO signal S2 functions as an upper-limit level of the governor CSO signal S1.

In the above operation as shown in FIG. 12, in a time period t2 (i.e., before the increase of the governor CSO signal S1 is limited), fuel is also suddenly increased so that the gas turbine 103 has a stress.

In addition, the combustor 102 operates according to the variation of the governor CSO signal S1, as follows: when the load suddenly decreases, the controller 110 limits the amount of fuel supplied to the main combustor 112 by suitably closing the fuel valve 109, thereby suppressing the increase of the relevant revolution speed. In this process, the controller 110 opens the bypass valve 115 so as to maintain a suitable fuel-air ratio, so that the amount of air supplied from the bypass valve 115 to the tail pipe 113 of the combustor increases. Accordingly, the amount of air supplied to the main combustor 112 is decreased, and the suitable fuel-air ratio is maintained.

However, in the conventional combined plant, the opening/closing speed of the bypass valve 115 is fixed. Therefore, the operation of opening the bypass valve 115 cannot follow the sudden closing of the fuel valve 109, so that an excessive amount of air is introduced into the main combustor 112, and this situation causes unstable combustion or the like.

SUMMARY OF THE INVENTION

In consideration of the above circumstances, an objective of the present invention is to provide a gas turbine plant and a method of controlling a gas turbine plant, for limiting a sudden increase of the load of the gas turbine, that is, a sudden increase of the amount of fuel, and suppressing a stress imposed on the gas turbine. Another objective of the present invention is to provide a gas turbine plant and a method of controlling a gas turbine plant, for maintaining a suitable fuel-air ratio.

Therefore, the present invention provides a gas turbine plant comprising:
  a gas turbine;
  a combustor for supplying a combustion gas to the gas turbine;
  a fuel valve for controlling an amount of fuel supplied to the combustor, and a controller for controlling the fuel valve, including:
    a governor control signal calculating section for calculating a governor control signal for controlling the degree of opening of the fuel valve, based on a revolution speed of the gas turbine;
    a load-limiting control signal calculating section for calculating a load-limiting control signal for following the governor control signal, wherein when the governor control signal decreases, the load-limiting control signal is larger than the governor control signal by a predetermined value, while when the governor control signal increases, the increase rate of the load-limiting control signal has a predetermined upper limit; and
    a limiting section, into which the governor control signal and the load-limiting control signal are input, for limiting the upper value of the governor control signal by using the load-limiting control signal as an upper limit of said upper value, thereby controlling the fuel valve.

In this gas turbine plant, when the level of the governor control signal (corresponding to the governor CSO signal in the embodiment explained below) decreases (even when the signal suddenly decreases), the load-limiting control signal (corresponding to the load-limiting CSO signal in the embodiment explained below) follows the governor CSO signal. When the governor control signal suddenly increases, the load-limiting CSO signal increases at an increase rate having the predetermined upper limit, so that the level of the governor control signal may be larger than that of the load-limiting control signal. Therefore, the limiting section limits the governor control signal by using the load-limiting control signal as the upper limit, thereby avoiding a sudden increase of the output of the gas turbine. As the load-limiting control signal follows the governor control signal during a sudden decrease of the governor control signal, the limitation of the increase rate of the governor control signal becomes quickly effective even when the output of the gas turbine suddenly increases immediately after a sudden decrease of the gas turbine output. This is a distinctive feature in comparison with the conventional example shown by FIG. 12.

The present invention also provides a method of controlling a gas turbine plant comprising a gas turbine, a combustor for supplying a combustion gas to the gas turbine, and a fuel valve for controlling an amount of fuel supplied to the combustor, the method comprising the steps of:
  calculating a governor control signal for controlling the degree of opening of the fuel valve, based on a revolution speed of the gas turbine;
  calculating a load-limiting control signal for following the governor control signal, wherein when the governor control signal decreases, the load-limiting control signal is larger than the governor control signal by a predetermined value, while when the governor control signal increases, the increase rate of the load-limiting control signal has a predetermined upper limit; and
  controlling the fuel valve based on a control signal for limiting the upper value of the governor control signal by using the load-limiting control signal as an upper limit of said upper value.

Also according to this method, the governor control signal is limited by using the load-limiting control signal as the upper limit and the limited signal is output to the fuel valve, thereby avoiding a sudden increase of the output of the gas turbine. In addition, when the level of the governor control signal suddenly decreases, the load-limiting control signal follows it, so that also in this method, the limitation of the increase rate of the governor control signal becomes quickly effective even when the output of the gas turbine suddenly increases immediately after a sudden decrease of the gas turbine output.

The present invention also provides a gas turbine plant comprising:
  a gas turbine;
  a combustor to which fuel and air are supplied, including:
    a main combustor into which the supplied fuel and air are introduced;
    a tail pipe, to which a combustion gas is introduced from the main combustor, for introducing the combustion gas to the gas turbine; and
    a bypass valve for introducing a portion of the air supplied to the main combustor into the tail pipe;
  a fuel valve for controlling an amount of the fuel supplied to the combustor;
  a bypass valve controller for controlling the bypass valve at an opening/closing speed according to a variation of the output of the gas turbine; and
  a fuel valve controller for controlling the fuel valve.

According to this gas turbine plant, even when the variation of the output of the gas turbine is large, the opening/closing operation of the bypass valve can be quickly performed according to the sudden opening/closing operation of the fuel valve.

In this gas turbine plant, a single controller may function as both the bypass valve controller and the fuel valve controller.

Also in this gas turbine plant, preferably, the bypass valve controller includes:

a bypass valve opening-degree calculating section for calculating a set value of the degree of opening of the bypass valve corresponding to the output of the gas turbine;

an opening/closing speed calculating section for calculating a width of the variation of the output of the gas turbine, and calculating an opening/closing speed of the bypass valve based on the calculated width of the variation; and a first change rate limiter for controlling the bypass valve by using the opening/closing speed calculated by the opening/closing speed calculating section as a change rate of the set value of the degree of opening of the bypass valve calculated by the bypass valve opening-degree calculating section.

In this structure, the bypass valve opening-degree calculating section calculates a suitable degree of opening of the bypass valve according to the output of the gas turbine. The opening/closing speed calculating section provides the opening/closing speed of the bypass valve, which is used when the degree of opening of the bypass valve is changed from the current degree to one indicated by the relevant set value. The larger the width of the variation of the output of the gas turbine, the higher the calculated opening/closing speed becomes. The first change rate limiter outputs a signal for controlling the bypass valve based on the obtained opening/closing speed.

Also preferably, the opening/closing speed calculating section includes:

a second change rate limiter, into which the output of the gas turbine is input, for converting an increase/decrease change rate of the output of the gas turbine into a predetermined change rate, and outputting a reference output having the predetermined change rate;

a subtracter, into which the output of the gas turbine and the reference output are input, for calculating a difference between the output of the gas turbine and the reference output; and a change rate calculator for calculating the opening/closing speed of the bypass valve according to the calculated difference.

In this structure, when the output of the gas turbine greatly decreases, the second change rate limiter outputs a signal which decreases with a predetermined change rate (refer to FIGS. 7A and 7B in the embodiment explained below). The subtracter calculates a difference between the output from the second change rate limiter and the output of the gas turbine (refer to FIG. 7C in the embodiment explained below). The larger this difference, the higher the opening/closing speed of the bypass valve (calculated by the change rate calculator) becomes.

The present invention also provides a method of controlling a gas turbine plant which comprises:

a gas turbine;

a combustor to which fuel and air are supplied, including:
    a main combustor into which the supplied fuel and air are introduced;
    a tail pipe, to which a combustion gas is introduced from the main combustor, for introducing the combustion gas to the gas turbine; and
    a bypass valve for introducing a portion of the air supplied to the main combustor into the tail pipe; and a fuel valve for controlling an amount of the fuel supplied to the combustor, and wherein the method comprises the step of controlling the bypass valve at an opening/closing speed according to a variation of the output of the gas turbine.

Accordingly, even when the variation of the output of the gas turbine is large, the opening/closing operation of the bypass valve can be quickly performed according to the sudden opening/closing operation of the fuel valve.

In this method, the step of controlling the bypass valve may include:

calculating a width of the variation of the output of the gas turbine;

calculating an opening/closing speed of the bypass valve based on the calculated width of the variation; and controlling the opening/closing operation of the bypass valve by using the calculated opening/closing speed.

When the degree of opening of the bypass valve is changed from the current value to a set value, the opening/closing speed of the bypass valve is necessary. According to this method, the larger the width of the variation of the output of the gas turbine, the higher the calculated opening/closing speed becomes.

In this method, the step of controlling the bypass valve may include:

converting an increase/decrease change rate of the output of the gas turbine into a predetermined change rate;

determining a reference output having the predetermined change rate;

calculating a difference between the output of the gas turbine and the reference output; and determining the calculated difference as the width of the variation of the output of the gas turbine.

Also in this case, even when the output of the gas turbine greatly decreases, a reference output having the predetermined change rate is determined in advance (refer to FIGS. 7A and 7B in the embodiment explained below), and a difference between the reference output and the output of the gas turbine (corresponding to the difference between FIGS. 7A and 7B) is calculated. The larger this difference, the higher the opening/closing speed of the bypass valve becomes.

As explained above, according to the present invention, the upper value of the governor control signal is limited by the load-limiting control signal, thereby preventing a sudden increase of the temperature of the gas turbine. In addition, the limitation of the governor control signal by using the load-limiting control signal becomes quickly effective, thereby reducing the stress imposed on the governor control signal, in comparison with the conventional gas turbine plant.

DESCRIPTION OF THE PREFERRED EMBODIMENTS

Hereinafter, embodiments according to the present invention will be explained in detail with reference to the drawings.

Figure 13:
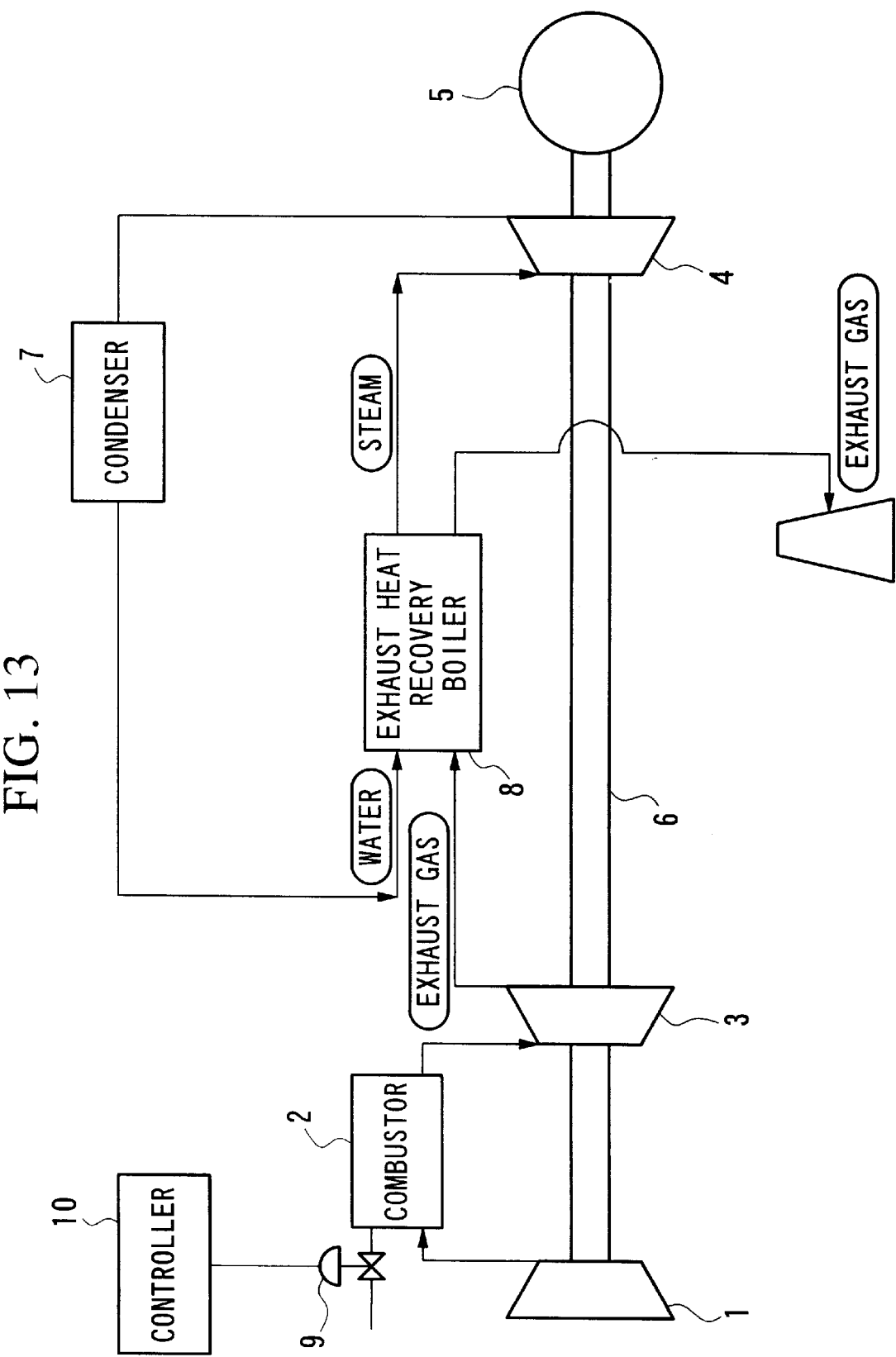
FIG. 13 is a diagram showing the general structure of a gas turbine plant as an embodiment of the present invention.

FIG. 13 is a diagram showing the general structure of a single-shaft combined plant (i.e., gas turbine plant) as an embodiment of the present invention.

In the shown single-shaft combined plant, reference numeral 1 indicates a compressor for absorbing and compressing the air, reference numeral 2 indicates a combustor to which combustion oil and combustion air (which has been compressed in the compressor 1) are supplied, reference numeral 3 indicates a gas turbine which rotates when receiving the combustion gas generated by the combustor 2, reference numeral 4 indicates a steam turbine coupled with the gas turbine 3, and reference numeral 5 indicates a generator.

The above gas turbine 3, compressor 1, steam turbine 4, and generator 5 are coupled with each other via a coupling shaft 6.

The drive source for the steam turbine 4 is an exhaust heat recovery boiler 8. The exhaust heat recovery boiler 8 generates steam by using heat collected from the high-temperature exhaust gas output from the gas turbine 3, and introduces the generated steam into the steam turbine 4. Reference numeral 7 indicates a condenser into which exhaust steam from the steam turbine 4 is introduced. The condenser 7 condenses the introduced steam and returns condensate (i.e., condensed water) to the exhaust heat recovery boiler 8.

Reference numeral 9 indicates a fuel valve for controlling the amount of fuel supplied to the combustor 2. This fuel valve 9 is controlled by a controller 10.

Figure 14:
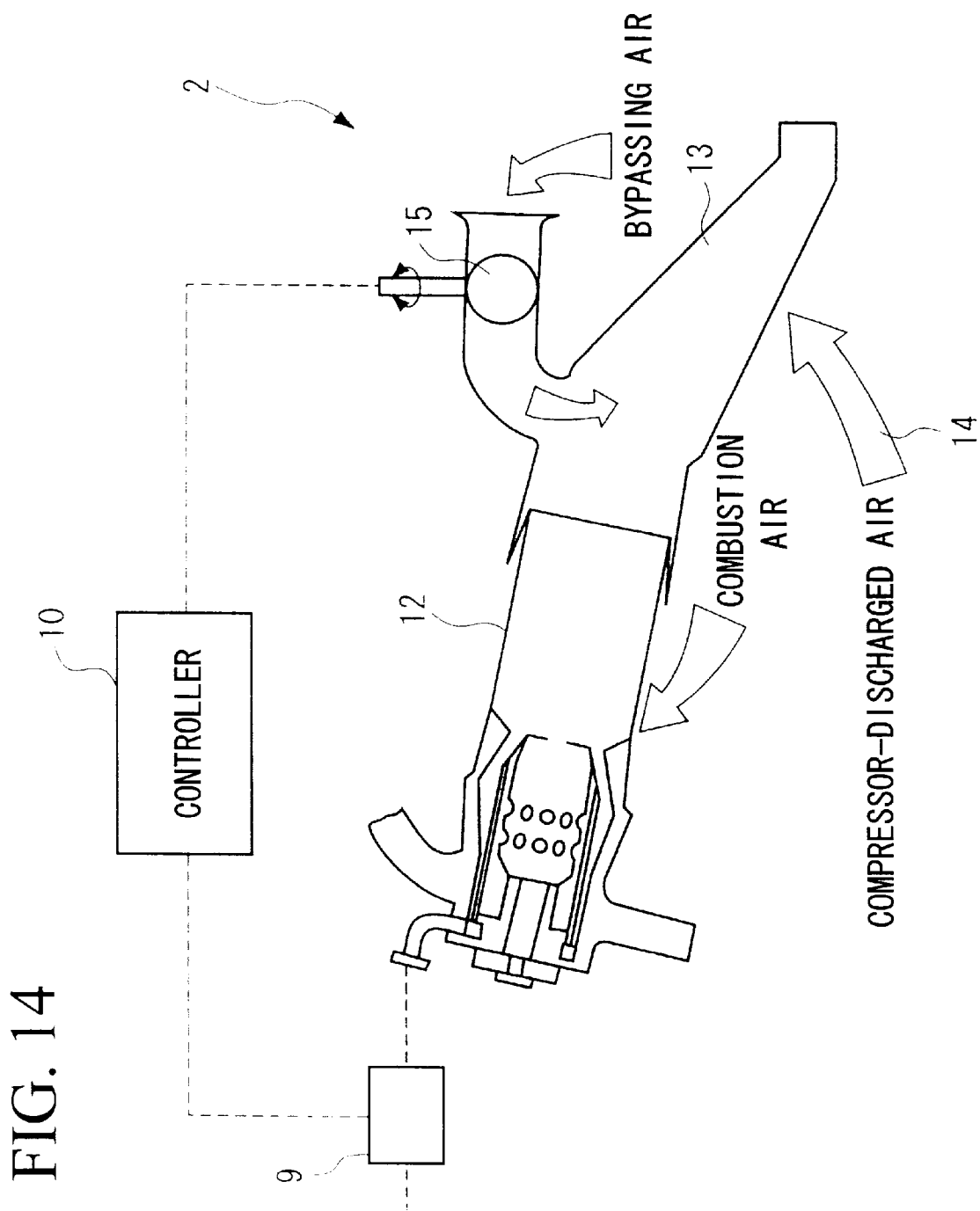
FIG. 14 is a diagram showing the general structure of a combustor used in the gas turbine plant of the embodiment.

The combustor 2 has a structure shown in FIG. 14. In FIG. 14, reference numeral 12 indicates a main combustor, and reference numeral 13 indicates a tail pipe of the main combustor. Fuel is supplied to the main combustor 12 via the fuel valve 9, and air 14 is also supplied to the main combustor 12 from the compressor 1, thereby combusting the fuel.

Reference numeral 15 indicates a bypass valve which is controlled by the controller 10. Depending on the degree of opening of the bypass valve 15, the distribution of air from the compressor 1, that is, the ratio of air supplied to the main combustor 12 to air supplied to the tail pipe 13, is determined.

In the combined plant having the structure explained above, when the frequency of the electric power system is changed due to a load change, the frequency must be stabilized by controlling the generated power. The above controller 10 controls the fuel valve 9 so as to recover a suitable frequency, thereby controlling the output of the gas turbine 3.

Figure 1:
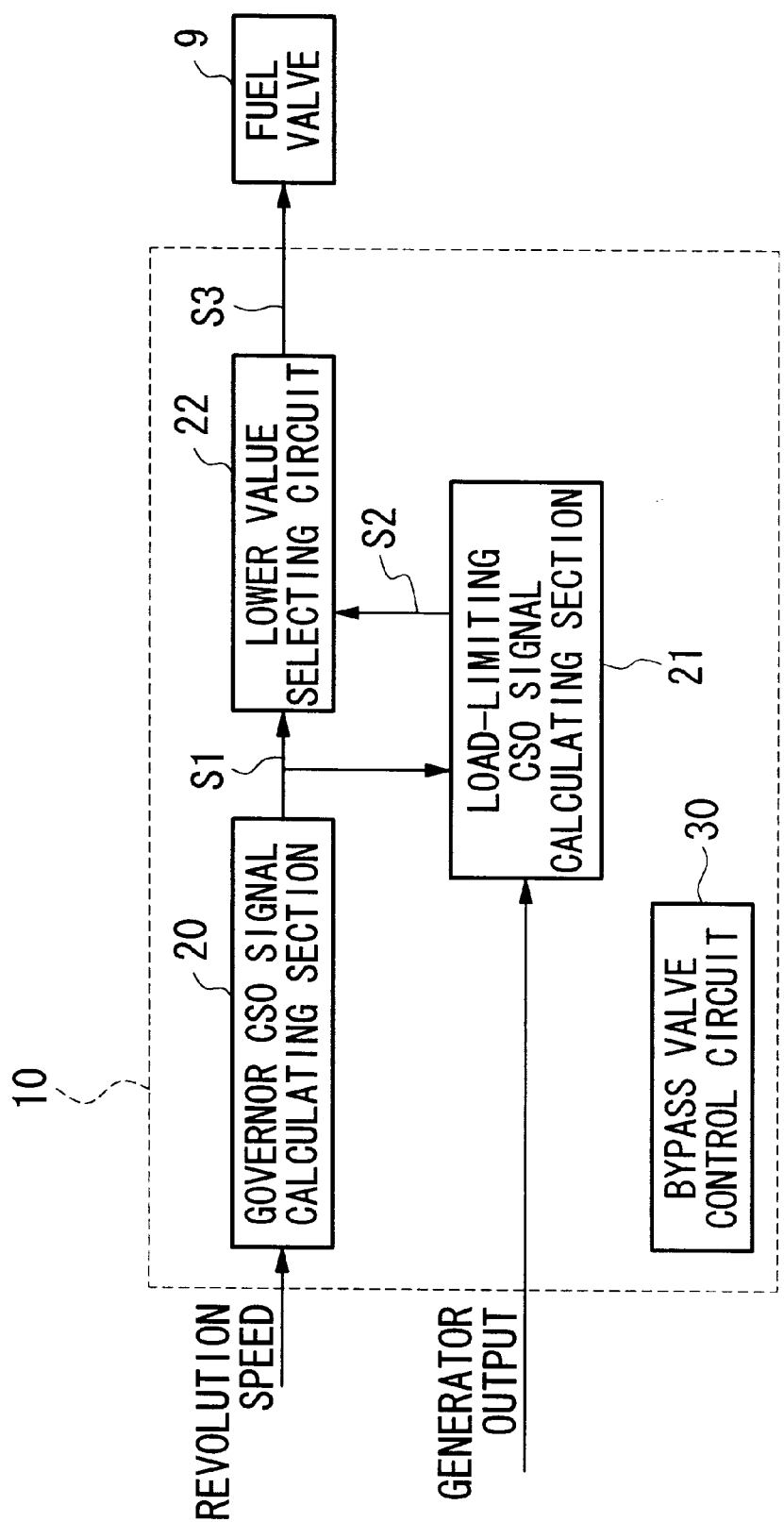
FIG. 1 is a block diagram showing the structure of a controller provided in the gas turbine plant as an embodiment according to the present invention.

A concrete example of such a control will be explained below. FIG. 1 shows a block diagram of the structure of the controller 10.

The controller 10 comprises a governor CSO signal calculating section 20 (corresponding to the governor signal calculating section of the present invention), a load-limiting CSO signal calculating section 21 (corresponding to the load-limiting signal calculating section of the present invention), and a lower value selecting circuit 22 (corresponding to the limiting section of the present invention).

The revolution speed of the gas turbine 3 is input into the governor CSO signal calculating section 20, and the governor CSO signal calculating section 20 calculates the amount of load of the gas turbine 3 based on the received revolution speed, and calculates (the value of) the governor CSO signal S1 for controlling the degree of opening of the fuel valve 9 based on the calculated amount of load.

The load-limiting CSO signal calculating section 21 calculates (the value of) the load-limiting CSO signal S2 for satisfying the conditions that (i) when the governor CSO signal S1 decreases, the load-limiting CSO signal S2 follows the governor CSO signal S1 in a manner such that the level of the load-limiting CSO signal S2 is higher than the governor CSO signal S1 by a predetermined tracking width, and (ii) when the governor CSO signal S1 increases, the load-limiting CSO signal S2 follows the governor CSO signal S1 with an increase rate having a predetermined limit.

The lower value selecting circuit 22 limits the upper level of the governor CSO signal S1 by using the load-limiting CSO signal S2.

Figure 2:
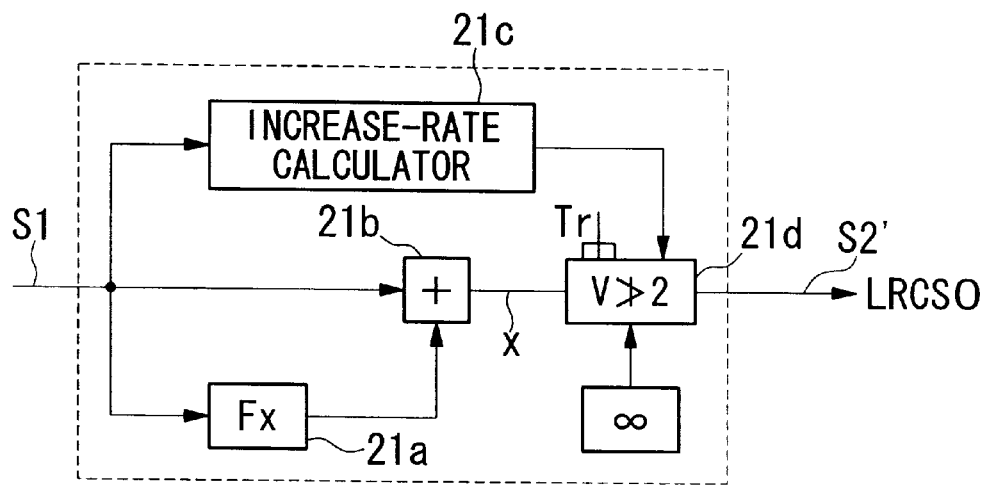
FIG. 2 is a block diagram showing the structure of an upper-limit value calculating section in the load-limiting CSO signal calculating section in the controller.
Figure 3:
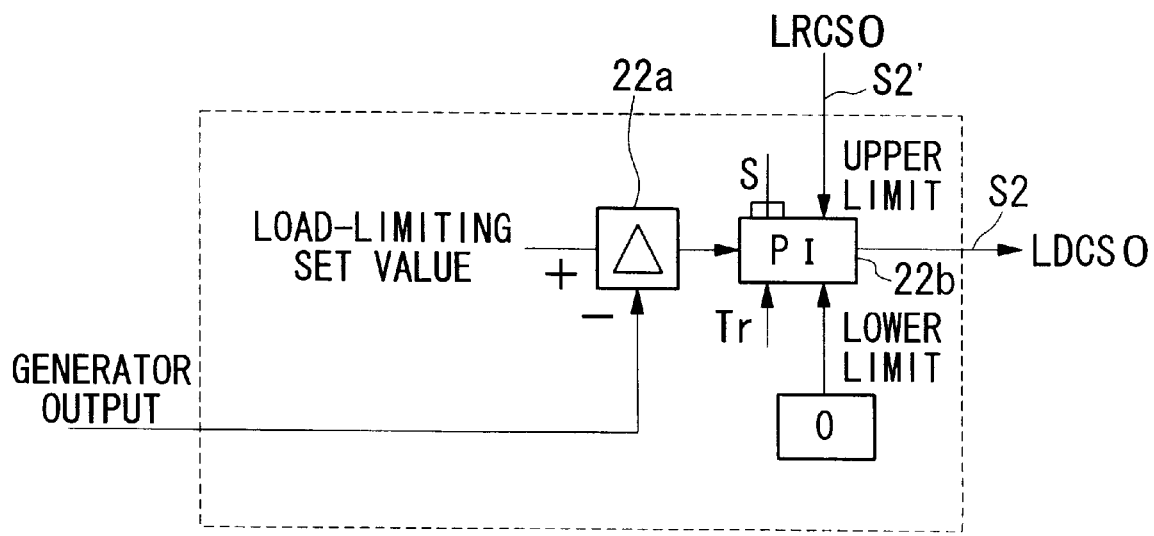
FIG. 3 is a block diagram showing the structure of a load-limiting CSO signal computing circuit in the load-limiting CSO signal calculating section in the controller.

FIGS. 2 and 3 show the detailed structure of the load-limiting CSO signal calculating section 21. The load-limiting CSO signal calculating section 21 comprises a calculator 21a for calculating a predetermined tracking width with respect to the governor CSO signal S1, an adder 21b for adding the tracking width to the governor CSO signal S1, and an increase-rate calculator 21c for calculating a specific increase rate based on the governor CSO signal S1. The load-limiting CSO signal calculating section 21 also comprises a change rate limiter 21d into which the outputs from the adder 21b and the increase-rate calculator 21c are input. In the change rate limiter 21d, for a given input value x output from the adder 21b (into the change rate limiter 21d), the increase rate of the input value x is limited by the value output from the increase-rate calculator 21c, while the decrease rate is not limited. The increase or decrease rate is then output from the change rate limiter 21d, and the output is input into a PI controller in FIG. 3 (explained below) as an upper-limit value S2' with respect to the PI controller for computing the load-limiting CSO signal (called "LRCSO signal", hereinbelow).

FIG. 3 shows the structure of a load-limiting CSO (LDCSO) signal computing circuit 200 included in the load-limiting CSO signal calculating section 21. In this circuit 200, reference numeral 22a indicates a subtracter for calculating a difference between a load-limiting set value (i.e., current load-limiting value) and the generator output, and reference numeral 22b indicates a PI controller into which the difference calculated by the subtracter 22a is input. In addition, in the present embodiment, the upper value output from the PI controller 22b is limited by an LRCSO signal S2'.

Figure 4:
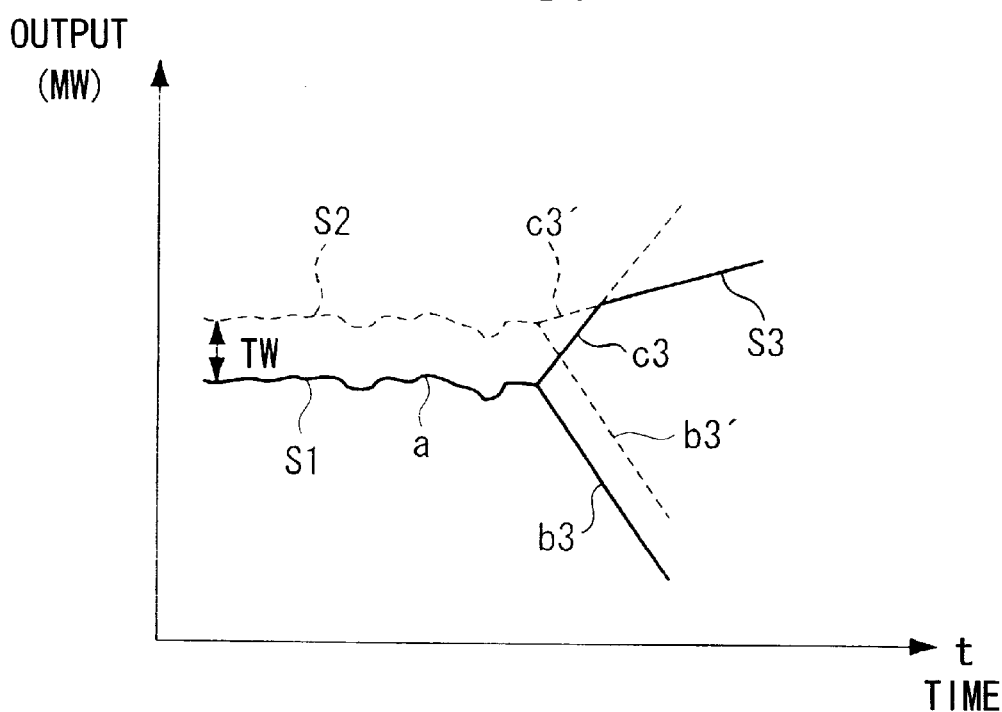
FIG. 4 is a graph showing a relationship between the governor CSO signal and the load-limiting CSO signal.

In FIG. 4, reference symbol S1 indicates a governor CSO signal, and reference symbol TW shows the tracking width. The governor CSO signal S1 is output by the controller 10 to the fuel valve 9, so as to control the output of the gas turbine 3.

In the normal state, as shown by reference symbol "a", the controller 10 suitably varies the governor CSO signal S1 (i.e., the output of the gas turbine 3) so as to fix the frequency of the electric system.

When the amount of load suddenly decreases, the relevant revolution speed suddenly increases, and thus the frequency also increases. In this case, as shown by reference symbol b3, the governor CSO signal calculating section 20 decreases the level of the governor CSO signal S1 so as to stabilize the frequency of the electric system.

On the other hand, when the amount of load suddenly increases, the relevant revolution speed suddenly decreases, and thus the frequency also decreases. In this case, as shown by a reference symbol c3, the governor CSO signal calculating section 20 increases the level of the governor CSO signal SI so as to stabilize the frequency of the electric system.

However, if the governor CSO signal S1 is suddenly increased, the temperature of the gas turbine 3 suddenly increases. It is not preferable because the gas turbine 3 should have a stress. Therefore, the load-limiting CSO signal calculating section 21 of the controller 10 successively calculates a load-limiting CSO signal S2. In the normal state or when the governor CSO signal S1 suddenly decreases, the load-limiting CSO signal S2 has a level obtained by adding the predetermined tracking width TW to the governor CSO signal S1, that is, the level of the load-limiting CSO signal S2 is higher than that of the governor CSO signal S1 by the tracking width TW. When the governor CSO signal S1 suddenly increases, the load-limiting CSO signal S2 is increased by a specific rate calculated by the increase-rate calculator 21c. The lower value selecting circuit 22 of the controller 10 limits the upper value of the governor CSO signal S1 by using the load-limiting CSO signal S2 as the limit value for the upper value of signal S1.

Therefore, when the governor CSO signal S1 suddenly decreases, the level of the load-limiting CSO signal S2 follows the governor CSO signal S1 and thus decreases as shown by reference symbol b3', and when the governor CSO signal S1 suddenly increases, the relationship between the levels of the load-limiting CSO signal S2 and the governor CSO signal S1 (i.e., which is larger) is reversed when a predetermined time has elapsed after the start of the sudden increase (refer to c3'). Therefore, the governor CSO signal S1 is limited by the lower value selecting circuit 22, so that the load-limiting CSO signal S2 whose increase rate does not excess a specific rate is selected and output to the fuel valve 9.

Figure 5:
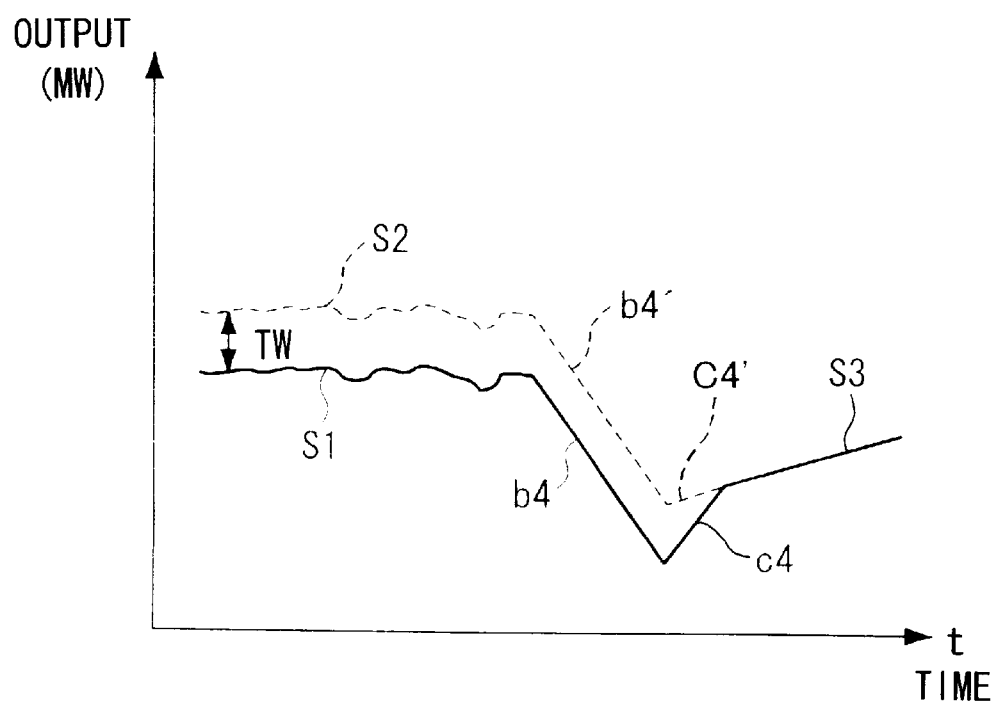
FIG. 5 is a graph showing a relationship between the governor CSO signal and the load-limiting CSO signal when the load suddenly increases immediately after a sudden decrease thereof.

FIG. 5 shows variations of the signals when the load suddenly increases immediately after the load suddenly decreases. During the sudden decrease, the governor CSO signal S1 decreases without limitation, as shown by reference symbol b4, and the load-limiting CSO signal S2 decreases while following the governor CSO signal S1, as shown by reference symbol b4'.

In the sudden increase of the load immediately after the above sudden decrease, the governor CSO signal S1 also suddenly increases (see reference symbol c4), and the load-limiting CSO signal S2 increases at a specific rate (see reference symbol c4'). As explained above, the lower value selecting circuit 22 limits the increase of the governor CSO signal S1 by using the load-limiting CSO signal S2 as the upper-limit value. Therefore, when a predetermined time has elapsed after the start of the sudden increase, the load-limiting CSO signal S2 by which the increase of the governor CSO signal S1 is limited is selected and output to the fuel valve 9.

As explained above, when the governor CSO signal S1 is in the normal state (that is, does not suddenly change) or suddenly decreases, the load-limiting CSO signal S2 always has a value (or a level) higher than that of the governor CSO signal S1 by a predetermined tracking width. When the governor CSO signal S1 suddenly increases, the load-limiting CSO signal S2 is increased at a specific rate. The controller 10 limits the upper value of the governor CSO signal S1 by using the load-limiting CSO signal S2, thereby preventing a sudden increase of the temperature of the gas turbine 3.

Figure 12:
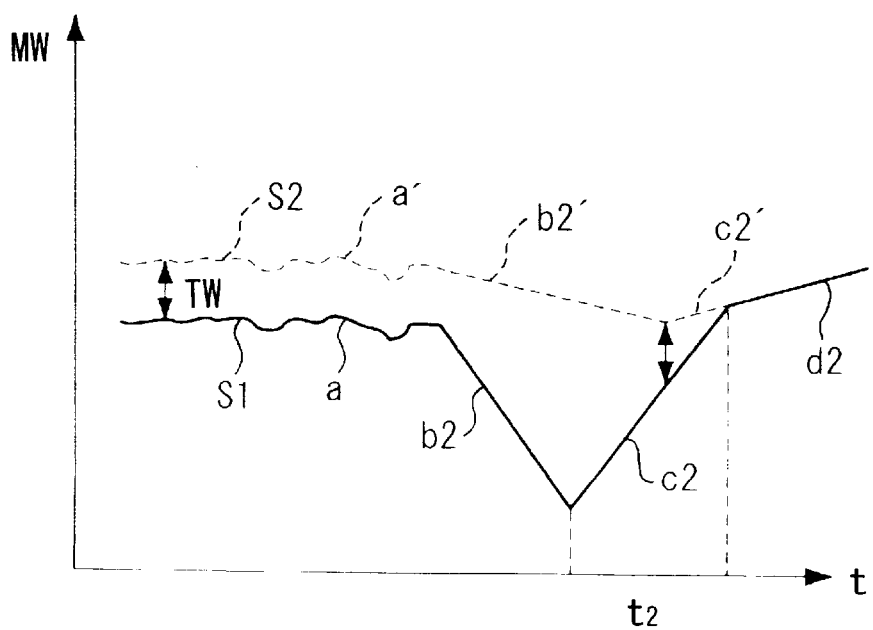
FIG. 12 is a graph showing a relationship between the governor CSO signal and the load-limiting CSO signal when the load suddenly increases immediately after a sudden decrease thereof in the conventional gas turbine plant.

In addition, as clearly understood by comparing the conventional example (see FIG. 12) with the present embodiment (see FIG. 5), when the governor CSO signal S1 suddenly increases after a sudden decrease, the governor CSO signal S1 much more quickly follows the load-limiting CSO signal S2 in the present invention, so that the increase of the governor CSO signal S1 is quickly limited. Therefore, less stress is imposed on the gas turbine 3 in comparison with the conventional example.

Below, another embodiment of a circuit provided in the controller 10 will be explained.

Figure 6:
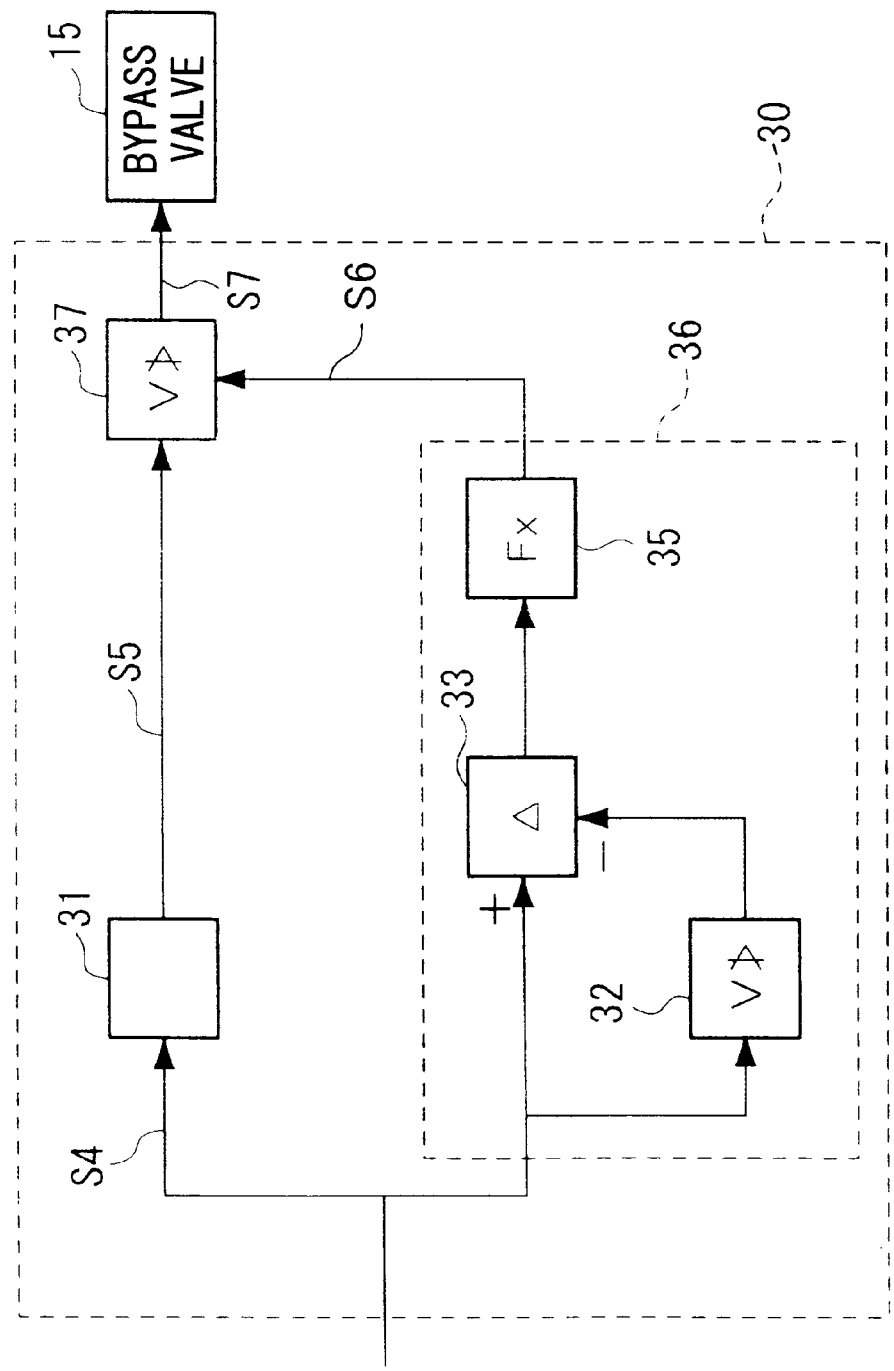
FIG. 6 is a block diagram showing the structure of a bypass valve control circuit provided in the controller.

In this embodiment, the controller 10 comprises a bypass valve control circuit 30 as shown in FIG. 6. In the figure, reference numeral 31 indicates a bypass valve opening-degree calculating section into which an output value S4 from the gas turbine 3 (called "GT output value", hereinbelow) is input. The bypass valve opening-degree calculating section 31 determines and outputs an opening-degree set value S5 which indicates a suitable degree of opening of the bypass valve 15 corresponding to the received GT output value S4.

Figure 7A:
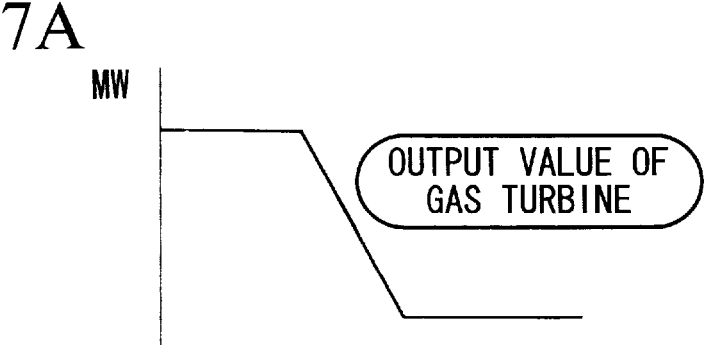
FIGS. 7A to 7E are graphs showing a variation of the relevant signals from the input of a gas-turbine output to the output of a bypass valve control command in the bypass valve control circuit.
Figure 7B:
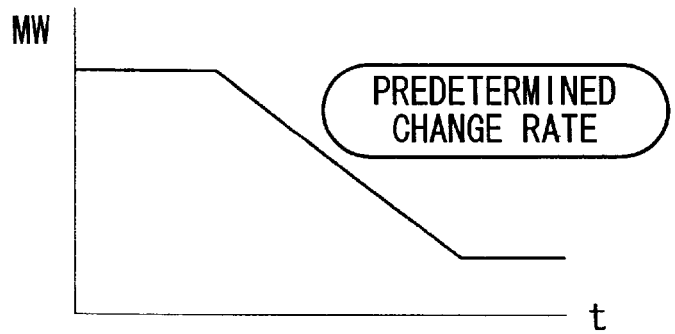

Reference numeral 32 indicates a change rate limiter (corresponding to the second change rate limiter of the present invention) into which the GT output value S4 is input, where the GT output value S4 changes according to the amount of load. The change rate limiter 32 determines and outputs a signal (corresponding to the GT output value S4) having a predetermined (increase/decrease) change rate. For example, as shown in FIG. 7A, even when the GT output value S4 greatly decreases, the change rate limiter 32 outputs a signal which decreases with a predetermined change rate (see FIG. 7B).

Figure 7C:
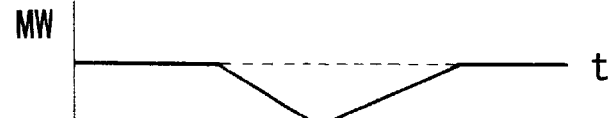

Reference numeral 33 indicates a subtracter for outputting a difference obtained by subtracting the output of the change rate limiter 32 from the GT output value S4. FIG. 7C shows the variation of the value output from the subtracter 33.

Figure 7D:
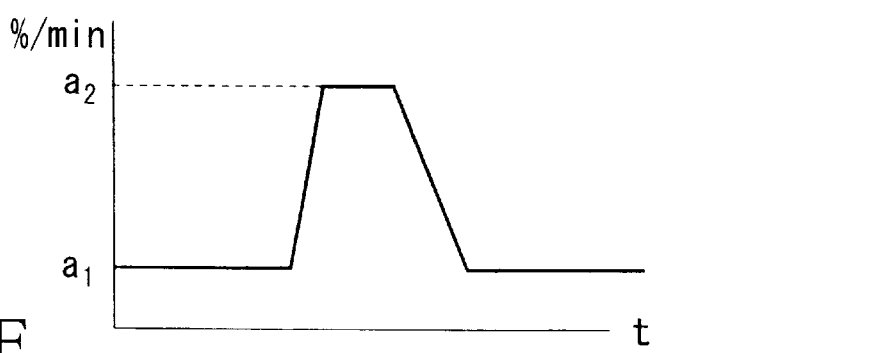
Figure 8:
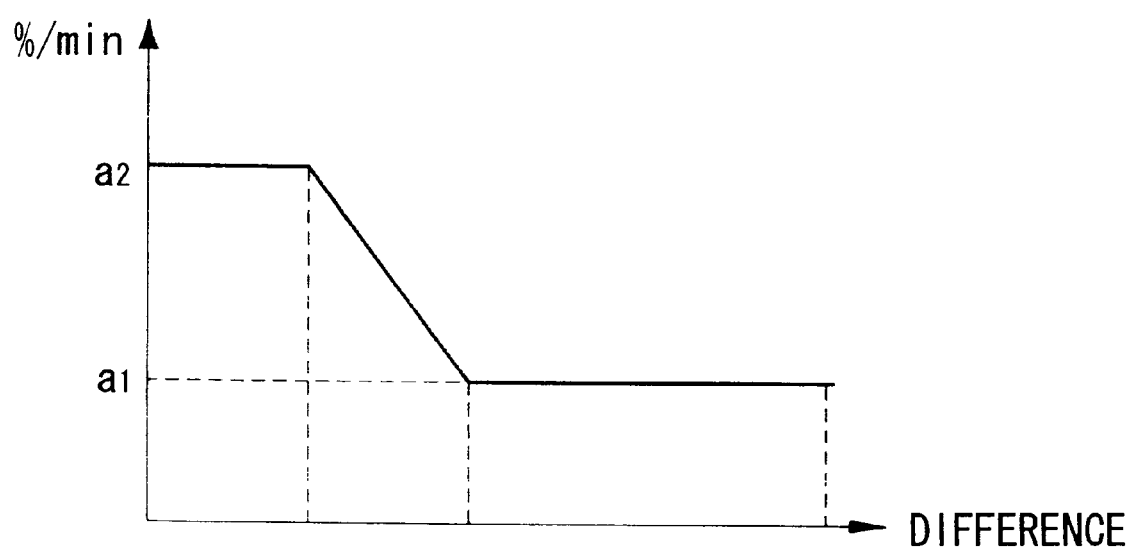
FIG. 8 is a graph showing a relationship between an amount of difference relating to the output of the gas turbine and a rate of change of the bypass valve stored in the bypass valve control circuit.
Figure 9:
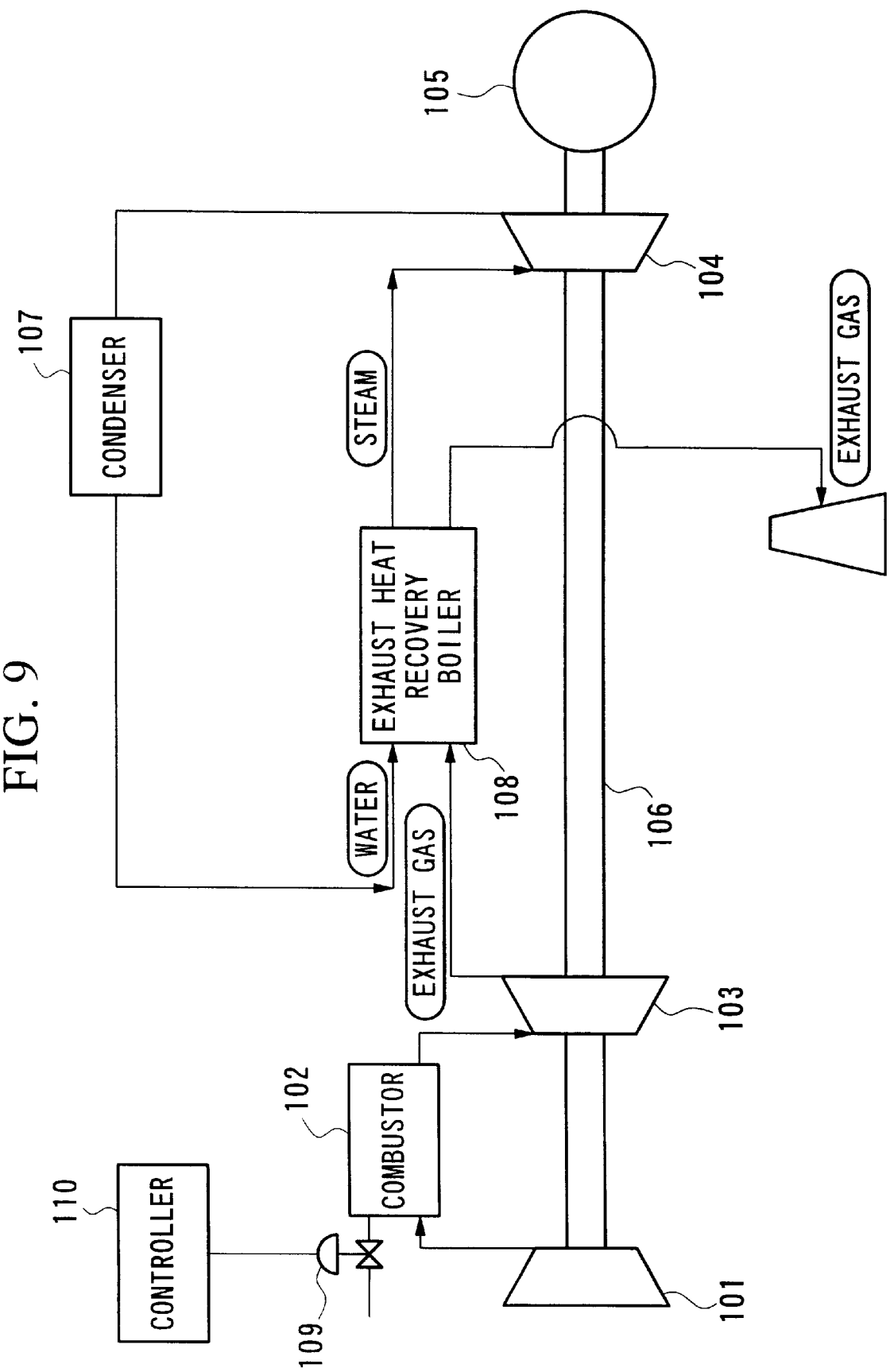
FIG. 9 is a diagram showing the general structure of a conventional gas turbine plant.
Figure 10:
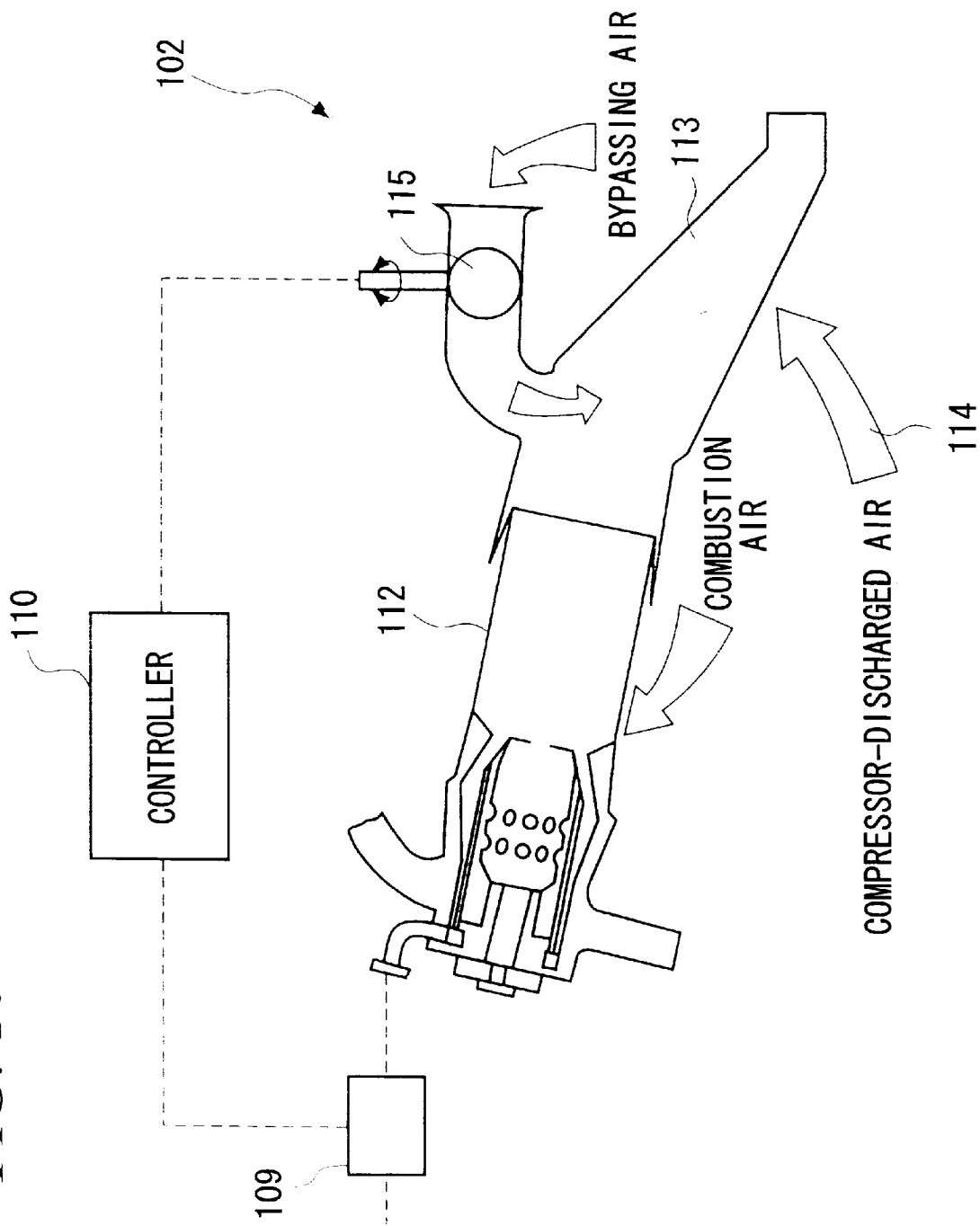
FIG. 10 is a diagram showing the general structure of a combustor used in the conventional gas turbine plant.
Figure 11:
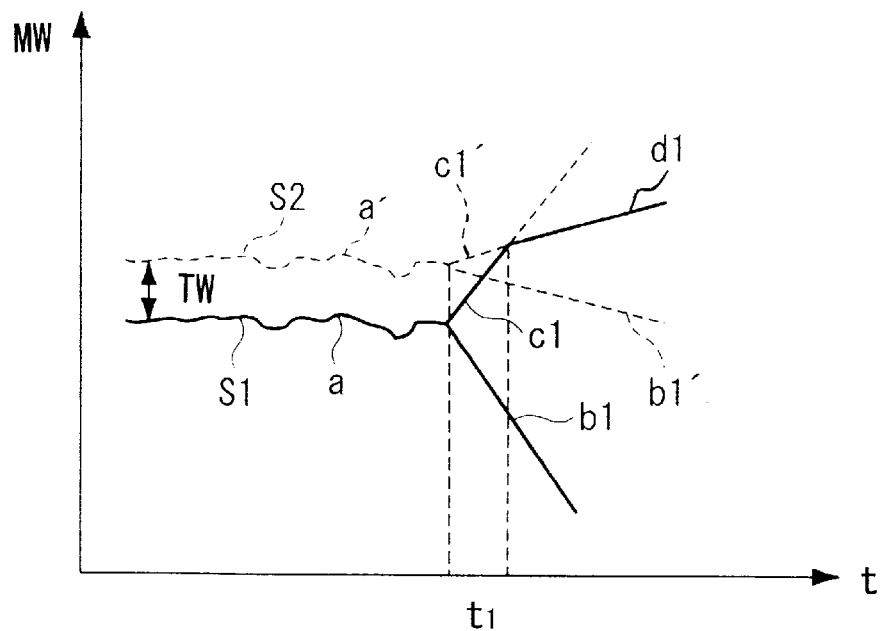
FIG. 11 is a graph showing a relationship between the governor CSO signal and the load-limiting CSO signal in the conventional gas turbine plant.

Reference numeral 35 indicates a change rate calculator into which the difference (value) calculated by the subtracter 33 is input. The change rate calculator 35 calculates and outputs a rate of change S6 of the bypass valve 15, suitable for the input value. FIG. 8 shows a relevant corresponding relationship. That is, when the difference is larger than a specific value, a rate of change a1 (%/min) is output, while when the difference is smaller than another specific value, a rate of change a2 (%/min) is output. If the difference varies as shown in FIG. 7C, the rate of change varies as shown in FIG. 7D.

The above change rate limiter 32, subtracter 33, and change rate calculator 35 constitute an opening/closing speed calculating section 36.

Reference numeral 37 indicates another change rate limiter (corresponding to the first change rate limiter of the present invention) for controlling the opening-degree set value S5 (output from the bypass valve opening-degree calculating section 31) based on the rate of change S6, and outputting the controlled value as a bypass valve opening-degree command S7 to the bypass valve 15. Accordingly, when the rate of change S6 varies as shown in FIG. 7D, the bypass valve opening-degree command S7 varies as shown by the solid line in FIG. 7E.

As explained above, according to the bypass valve control circuit 30 of the present embodiment, when the load suddenly decreases and the fuel valve 9 is suddenly closed, the bypass valve control circuit 30 increases the rate of closing of the bypass valve 15. More specifically, when the GT output suddenly decreases as shown in FIG. 7A, the value of the bypass valve opening-degree command S7 suddenly increases as shown by the solid line in FIG. 7E, thereby quickly controlling the degree of opening of the bypass valve 15.

Figure 7E:
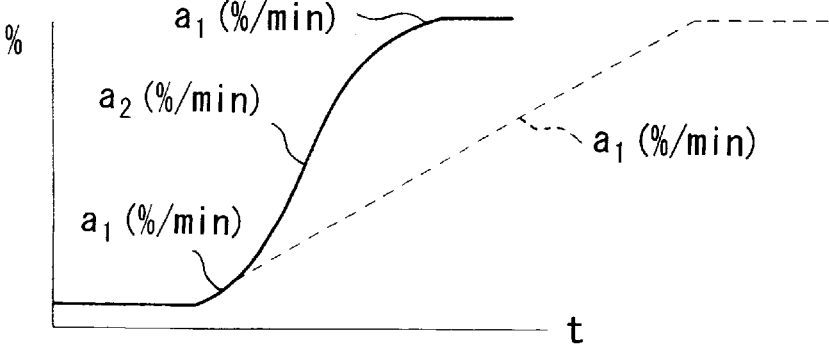

Here, if it is assumed that the rate of change of the bypass valve 15 be fixed at a1 as shown by the dotted line in FIG. 7E, the opening/closing timing of the bypass valve 15 should be late in comparison with the opening/closing timing of the fuel valve 9. However, in the present embodiment, the rate of change is increased to a2; thus, the operation of opening/closing the bypass valve 15 is quickly performed, thereby stabilizing the fuel combustion in the main combustor 12.

In addition, in the above-explained embodiment, a single controller 10 is provided for controlling the fuel valve 9 and the bypass valve 15. However, separate controllers for respectively controlling the fuel valve 9 and the bypass valve 15 may be provided.

What is claimed is:

1. A gas turbine plant comprising:
   a gas turbine;
   a combustor for supplying a combustion gas to the gas turbine;
   a fuel valve for controlling an amount of fuel supplied to the combustor, and
   a controller for controlling the fuel valve, including:
      a governor control signal calculating section for calculating a governor control signal for controlling the degree of opening of the fuel valve, based on a revolution speed of the gas turbine;
      a load-limiting control signal calculating section for calculating a load-limiting control signal for following the governor control signal, wherein when the governor control signal decreases, the load-limiting control signal is larger than the governor control signal by a predetermined value, while when the governor control signal increases, the increase rate of the load-limiting control signal has a predetermined upper limit; and
      a limiting section, into which the governor control signal and the load-limiting control signal are input, for limiting the upper value of the governor control signal by using the load-limiting control signal as an upper limit of said upper value, thereby controlling the fuel valve.

2. A method of controlling a gas turbine plant comprising a gas turbine, a combustor for supplying a combustion gas to the gas turbine, and a fuel valve for controlling an amount of fuel supplied to the combustor, the method comprising the steps of:
   calculating a governor control signal for controlling the degree of opening of the fuel valve, based on a revolution speed of the gas turbine, with a controller for controlling the fuel valve;
   calculating a load-limiting control signal for following the governor control signal with the controller, wherein when the governor control signal decreases, the load-limiting control signal is larger than the governor control signal by a predetermined value, while when the governor control signal increases, the increase rate of the load-limiting control signal has a predetermined upper limit; and
   controlling the fuel valve based on a control signal for limiting the upper value of the governor control signal by using the load-limiting control signal as an upper limit of said upper value with the controller.

* * * * *